United States Patent
Thakker et al.

[11] Patent Number: 6,017,615
[45] Date of Patent: Jan. 25, 2000

[54] FILM PRODUCT COMPRISING NOVEL POLYOLEFINS

[75] Inventors: Mahendra T. Thakker; Dharmendra Jani, both of Odessa, Tex.

[73] Assignee: Huntsman Polymers Corporation, Odessa, Tex.

[21] Appl. No.: 08/918,064

[22] Filed: Aug. 25, 1997

[51] Int. Cl.$^7$ ............................................. B32B 27/32
[52] U.S. Cl. ..................... 428/213; 428/215; 428/220; 428/515; 428/516; 428/520
[58] Field of Search ..................... 428/220, 213, 428/215, 515, 516, 520; 526/348, 348.2, 348.5, 351; 525/240

[56] References Cited

U.S. PATENT DOCUMENTS

| | | | |
|---|---|---|---|
| 4,399,180 | 8/1983 | Briggs et al. | 428/215 |
| 4,574,104 | 3/1986 | Aishima et al. | 428/220 |
| 4,856,656 | 8/1989 | Sugimoto et al. | 206/523 |
| 4,870,122 | 9/1989 | Lu | 524/488 |
| 5,041,316 | 8/1991 | Parnell et al. | 428/35.4 |
| 5,075,143 | 12/1991 | Bekele | 428/36.6 |
| 5,206,075 | 4/1993 | Hodgson, Jr. | 428/216 |
| 5,252,384 | 10/1993 | Bothe et al. | 428/212 |
| 5,254,393 | 10/1993 | Murschall et al. | 428/212 |
| 5,296,580 | 3/1994 | Matsunaga et al. | 528/502 |
| 5,358,792 | 10/1994 | Mehta et al. | 428/516 |
| 5,376,439 | 12/1994 | Hodgson et al. | 428/220 |
| 5,387,470 | 2/1995 | Parnell et al. | 428/215 |
| 5,397,613 | 3/1995 | Georgelos | 428/36.7 |
| 5,397,640 | 3/1995 | Georgelos et al. | 428/349 |
| 5,427,807 | 6/1995 | Chun et al. | 426/393 |
| 5,468,440 | 11/1995 | McAlpin et al. | 264/291 |
| 5,468,807 | 11/1995 | Tsurutani et al. | 525/240 |
| 5,472,792 | 12/1995 | Tsurutani et al. | 428/516 |
| 5,478,645 | 12/1995 | Chang | 428/347 |
| 5,478,890 | 12/1995 | Shinozaki et al. | 525/340 |
| 5,482,770 | 1/1996 | Bekele | 428/339 |
| 5,482,771 | 1/1996 | Shah | 428/349 |
| 5,523,136 | 1/1996 | Fischer et al. | 428/35.2 |
| 5,543,223 | 8/1996 | Shah | 428/516 |
| 5,558,930 | 9/1996 | Di Poto | 428/216 |
| 5,562,958 | 10/1996 | Walton et al. | 428/34.9 |
| 5,571,619 | 11/1996 | McAlpin et al. | 428/364 |
| 5,573,824 | 11/1996 | Klocek et al. | 526/138 |
| 5,582,923 | 12/1996 | Kale et al. | 428/523 |
| 5,589,561 | 12/1996 | Barry et al. | 428/348.1 |
| 5,593,747 | 1/1997 | Georgelos | 428/36.7 |
| 5,614,297 | 3/1997 | Velaquez | 428/218 |
| 5,629,059 | 5/1997 | Desai et al. | 428/34.9 |
| 5,635,262 | 6/1997 | Best et al. | 428/36.92 |
| 5,783,269 | 7/1998 | Heilmann et al. | 428/35.2 |

FOREIGN PATENT DOCUMENTS 0 611 801   8/1995   European Pat. Off. .

*Primary Examiner*—Paul Thibodeau
*Assistant Examiner*—D. Lawrence Tarazano
*Attorney, Agent, or Firm*—Russell R. Stolle; Ron D. Brown; Christopher J. Whewell

[57] ABSTRACT

Multi-layer film products comprising an inner or core layer made from polyolefin polymers produced by polymerizing an α-olefin in the presence of a catalyst including: a pro-catalyst having a magnesium halide; an aluminum halide; a tetravalent titanium halide, ;an electron donor; and a silane having the formula $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl; and a co-catalyst comprising an organometallic compound, or reaction products of the pro-catalyst and the co-catalyst. The film products have excellent clarity, superior dart impact, resistance to tear and favorable sealibility characteristics.

25 Claims, 1 Drawing Sheet

FILM PRODUCT COMPRISING NOVEL POLYOLEFINS

Inventors: Mahendra T. Thakker and Dharmendra Jani

TECHNICAL FIELD

This invention relates generally to multi-layer polyolefin film products which are adapted for use in the packaging industry. The films have improved physical properties over prior art films and preferably comprise at least three layers of two outer layers and an intermediate or core layer sandwiched therebetween wherein all of the layers are chlorine-free, exhibit improved clarity, autoclavability, gloss, and dart impact properties relative to all other chlorine-free polymeric multi-structure film composites in prior art. The films of this invention are especially well-suited for the packaging of medical products and foodstuffs, and are readily recycled.

BACKGROUND OF THE INVENTION

Multi-layer polymeric films must in general be possessive of several qualities in order to be useful in the various packaging industries, particularly where it is desired to employ the films to food product usage. In general, the films must have a high degree of clarity and gloss in order to impart a positive cosmetic appearance to the food product packaged, must have a high degree of resistance to tearing and/or puncture as measured by the dart impact test, should have a high resistance to deformation at elevated temperatures in order to assist in processibility and storage in various environments, should have sufficient tensile strength, tensile yield, hot tack strength, moisture impermeability, a wide heat seal range, high seal strength, good low temperature sealability, relatively low density, and should preferably be completely recyclable. From the recyclibility standpoint, it is highly desirable that the films be free from chlorine, and are comprised of materials compatible with a range of polymers.

The most popular materials conventionally employed as films in the packaging industry have included linear polyethylenes, high density polyethylenes, high molecular weight high density polyethylenes, ethylene vinylacetate copolymers, polyvinylchloride (PVC), isotactic and syndiotactic polypropylenes and interpolymers of the aforesaid either alone or in combination with one another as in, for example a polymer blend in either single-layer or multiple-layer structural arrangements.

The use of polypropylene as a multi-layer film material has been known for quite some time. The films are favorable from several standpoints, particularly of strength, scratch-resistance, and optical properties. However, the films exhibit very poor heat-sealing properties. To obviate the disadvantages inherent in polypropylene, outer skin or sealing layers comprising typically, for example, random copolymers of propylene with other alpha olefin monomers, are coextruded onto one or both sides of the base layer. However, these sealing layers generally have the disadvantage that often impair the optical properties of the film composite as a whole. Additionally, the higher melting points of the outer sealing layers can create difficulty when the temperature of the heat sealing device is set to the melting point of the outer layer insomuch as the excessive heat causes the inner layer(s) to pit or severely deform thus causing weakness along the seal. Alternatively, difficulty is seen when the heat sealing temperature is set for the melting point of the inner layers in that the outer layers do not become sufficiently fused to form a homogeneous seal. Machines for forming seals on polyolefin films typically have forming collars or bars which shape and hold a flat piece of film in a desired position and actuate hot metal sealing bars or jaws to contact the film, thus causing a seal to be formed. It is important that the outside of the film has a higher melting temperature than the inside of the film so that when the jaw re-opens or the bar is removed, the outside of the film which has not melted is not stuck to the sealing jaw or bar. When using multi-layer films the temperatures which must be applied for sealing are so high that it is difficult to achieve the proper balance of heat necessary between the layers, and severe shrinkage in the sealing zone is often a resultant problem. The finished packages have a less than optimal appearance and an inferior sealed-seam strength.

Another difficulty often encountered by pioneering film products intended for use in packaging foodstuffs are the regulations set forth by the US Food and Drug Administration (FDA) at 21 C.F.R. 177.1520 (d)(iii) and (d)(iv) related to the content of the films which are soluble in xylene and n-hexane.

Accordingly, it is an object of this invention to provide a flexible film product comprising only polymers of propylene wherein the sealing temperatures of the outer layers are close enough to that of the core layer to avoid processing difficulties affecting seal integrity.

It is a further object of this invention to provide a multi-layer film product having superior optical properties over similar films of prior art.

It is a further object to provide film products having the aforesaid qualities which is also suitable for use in the foodstuff packaging industries.

It is a further object of this invention to provide a multi-layered film structure which is free from chlorine.

It is a further object still of this invention to provide a multi-layered film product which can meet high heat resistance specifications required for high-speed processing of film products.

It is a further object of this invention to provide a multi-layered film product which is sufficiently tear and abrasion resistant to withstand conditions normally experienced by film products in the packing industry and end uses, and which meets FDA regulations for use with foodstuffs. by film products in the packing industry and end uses, and which meets FDA regulations for use with foodstuffs.

SUMMARY OF THE INVENTION

The film products of this invention are comprised of a novel polymeric material as a core layer and conventional-type polypropylene as outer or "skin" layers. It has been unexpectedly found that the film structure combination herein disclosed inherently satisfies the critical requirements of film products used in the packaging industry in general and the food packaging industry in particular.

The novel polymeric materials suitable as an inner layer in the multi-layer film products of this invention are composed predominantly of polypropylene. It is well known that crystalline polypropylene generally has an isotactic or syndiotactic structure and that amorphous polypropylene generally has considerable atactic structure. U.S. Pat. Nos. 3,112,300 and 3,112,301, for example, describe isotactic polypropylene and provide structural formulae for isotactic and syndiotactic polypropylene. Conventional polymers of this type typically have a crystallinity, or heat of fusion, of 75 Joules per gram (J/g) or higher, and more typically 90 J/g or higher.

In order to produce polyolefins, a monomeric alpha olefin raw material is generally contacted with a suitable catalyst under conditions of pressure and temperature sufficient for causing a polymerization of the monomer. Great volumes of investigation in the field of polymerization catalysis have yielded a multitude of polymeric products having a wide range of physical and chemical properties. By modifications to the catalyst and reaction conditions it is possible in some instances to produce materials especially suitable for a particular application. The inner layer polymeric material embodied in the instant disclosure is but one example of such.

Of the various known catalysts used for polymerizing olefins, the prior art patents forthwith presented disclose one type of catalyst used in the formation of such polymers. They include generally a pro-catalyst that is typically formed from the reaction product of a magnesium alkoxide compound of the formula $MgR_1R_2$ where $R_1$ is an alkoxy or aryl oxide group and $R_2$ is an alkoxide or an aryl oxide group or halogen, and a tetravalent titanium halide wherein the reaction takes place in the presence of an electron donor and, preferably, a halogenated hydrocarbon. These include: U.S. Pat. Nos. 5,118,768; 5,164,352; 5,089,573; 5,118,649; 5,118,767; 5,294,581; 5,118,768; 5,164,352; 5,438,110; 4,990,479; 5,218,052; 5,182,245; 5,153,158; 4,990,477; and in European Patent 475,307. The present invention employs a core layer having unique physical properties which is produced from a catalyst material not found in any prior art.

BRIEF DESCRIPTION OF THE DRAWINGS

Two embodiments of the present invention are more particularly described with reference to the accompanying drawing of FIG. 1 and FIG. 2 wherein.

DETAILED DESCRIPTION OF THE INVENTION INCLUDING A PREFERRED EMBODIMENT

Figure 1:
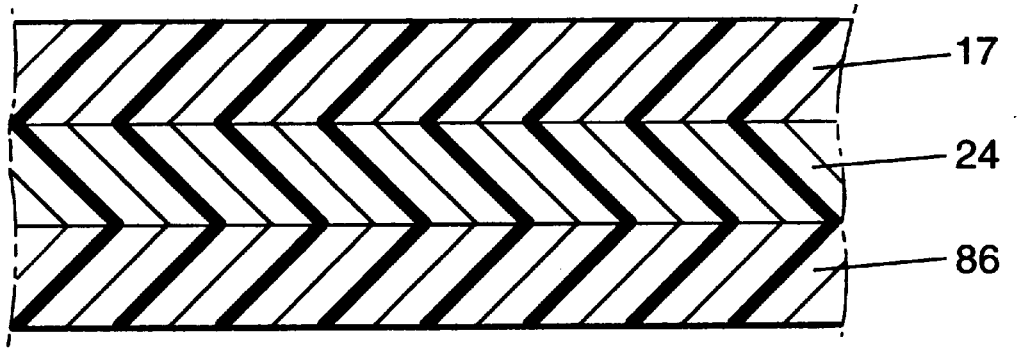
FIG. 1 is a schematic cross-sectional view of a preferred embodiment of a multi-layer film composite of this invention and FIG. 2 is a schematic cross-sectional view of-an alternative embodiment of a multi-layer film product according to this invention.
Figure 2:
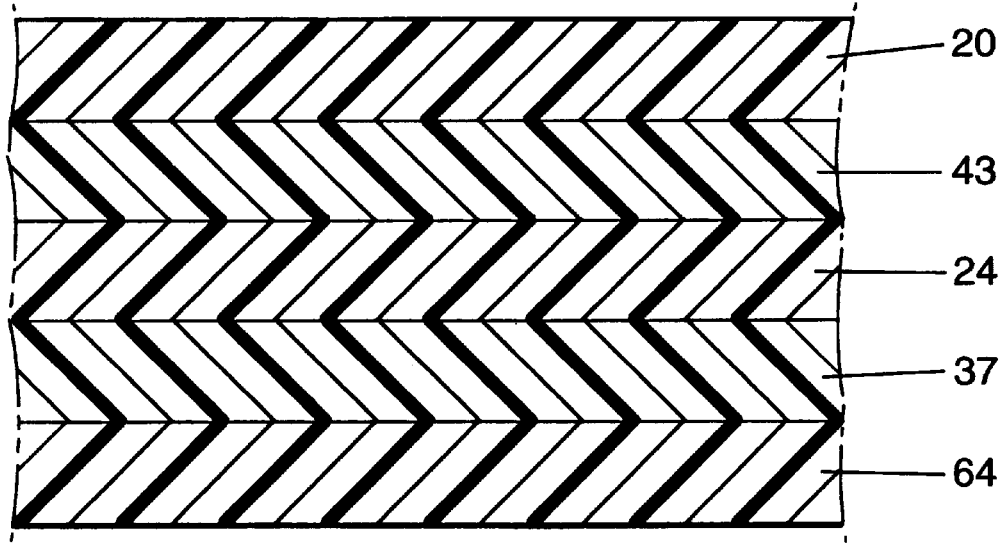

The present invention is a multi-layer film product which comprises an inner core layer and one or more outer skin layers disposed on at least one side of the core layer. FIGS. 1 and 2 depict cross sectional views of the multi-layer film products according to this invention. In FIG. 1, 24 represents the core layer; 17 and 86 each represent an outer skin layer. In FIG. 2, the core layer is depicted by 24; 20 and 64 are representative of the outer skin layers; and 43 and 37 depict intermediate layers sandwiched between the skin layers and core layer. The compositions of materials suitable for the various layers described are set forth below.

The inner core layer is comprised of a polyalphaolefin prepared by polymerizing an α-olefin monomeric raw material in the presence of a catalyst comprising the reaction product produced from the combination of a first catalyst component and a second catalyst component. The first catalyst component comprises an intimate anhydrous mixture of a magnesium halide, an aluminum halide, and a silane made preferably by ball milling the magnesium halide with the aluminum halide and then adding the silane component, and subsequently ball milling the resultant three component mixture further. Subsequently, a titanium halide which is preferably tetravalent, is added along with a nitrogen-containing organic compound and further ball milling is commenced which finally yields what is referred to by some in the art as a "pro-catalyst". The pro-catalyst is subsequently mixed with a second catalyst component which includes an organometallic compound, preferably tri-ethyl aluminum, to produce the final active catalyst material by which the polymeric core layer polymer of this invention is derived from polymerization of an alpha-olefin. Optionally, a second silane material may be added to the finished catalyst to assist in controlling the crystallinity of the polymeric core material products manufactured to a desired level.

The core layer of the film product according to this invention may be comprised of a polymer prepared from a wide variety of monomeric raw materials. For example, one or more monomers selected from the group of alpha olefins including propylene, ethylene, butene, pentene, octene, or mixtures thereof may be employed as feedstocks. When ethylene is selected, it is provided in the raw material feed in an amount of about 1 to 20 weight percent. It is also desirable to include hydrogen in the raw material feed in an amount not to exceed about 10 weight percent.

The multi-layer film product of this invention is produced by co-extrusion.

The Core Layer Composition

A new catalyst capable of producing a new class of polymers, (flexible polyolefins, or "FPO's"), has, by virtue of recent investigative efforts been created and discovered to yield a controllable degree of crystallinity in polyolefin polyjmers lower than that found in commercial isotactic polypropylene. This class of polymers has been unexpectedly found to yield a core layer for film products having enhanced physical properties over film products produced from prior art catalysts and methods.

The catalyst employed for the production of the FPO polymers used as the core layer in the instant invention includes a pro-catalyst component which is combined with a co-catalyst component in order to form a finished catalyst material to which an external modifier compound may preferably be added. The pro-catalyst includes a magnesium halide, an aluminum halide, a tetravalent titanium halide, a particular nitrogen-containing organic compound which functions as an electron donor, and an internal modifier that is typically a silane component. The co-catalyst is an organometallic compound. The external modifier is a second silane compound.

Catalyst preparation begins with the magnesium halide and aluminum halide being combined, preferably with some degree of mixing, for example, by ball milling. The mixing is carried out at about room temperature, although the exact temperature is not a crucial aspect of catalyst preparation. The silane component, or internal modifier, is typically a liquid and is added to these halides either before or after they are mixed.

The silane and halides are preferably mixed by pulverization in a ball mill to form a first mixture before additional components are added. Suitable milling of these pro-catalyst components is readily accomplished in a 1L stainless steel rotary mill pot filled to about 50 volume percent with ½" stainless steel balls.

After the initial ball milling, the electron donor and a titanium halide are combined with the halide and silane mixture. The specific amounts added are determined relative to the other catalyst ingredients, and fall within the atomic ratio range described elsewhere herein. The donor and titanium halide are both preferably liquid, and may be added at once or slowly to the other catalyst ingredients. These are preferably sprayed into the ball mill or other vessel, although any means of addition is acceptable. The combination of the electron donor, titanium halide, and first mixture comprising silane and mixed halides of magnesium and aluminum is then mixed, preferably by ball milling, in order to form the pro-catalyst. It is preferred that the mixing occur over a period of about 4 to 40 hours, more preferably about 8 to 30 hours, and most preferably about 12 to 25 hours.

After milling the pro-catalyst, a co-catalyst is added to provide an active catalyst material suitable for producing core layer polymers according to the instant invention. An optional external modifier (which is also a silane) may be subsequently added to the active catalyst material to modify the catalyst and enable it to produce flexible polyolefins having reduced tackiness.

The relative amounts of each component in the catalyst can vary over well defined ranges. Specifically, the molar ratio of Mg:Al:Si:N:Ti is about 8:0.01:0.01:0.2:1 to 80:30:0.5:1.2:1, preferably 12:1:0.1:0.3:1 to 70:25:0.4:1:1 Mg:Al:Si:N:Ti. In a more preferred embodiment, the molar ratio of Mg:Al:Si:N:Ti is about 14.9:1.9:0.2:0.6:1. In these ratios, Mg, Al and Ti designate atomic contributions of these elements from halides, Si designates the silicon contribution from the silane component, and N designates the nitrogen contribution from the internal donor.

Any titanium halide is suitable for mixing with the magnesium and aluminum halides, although titanium tetrahalides are preferred and titanium tetrachloride is the most preferred. Although any aluminum halide is suitable for use in the catalyst, aluminum tri-chloride is preferred. Similarly, although any magnesium halide is suitable for use in the catalyst, magnesium di-chloride is preferred. The titanium halide is preferably a liquid when added, as are the electron donor and the silane component.

The nitrogen-containing organic compounds function as internal electron donors and are classified as being either Type I or Type II. Type I internal donors are used to increase the pro-catalyst surface area and accordingly the catalyst activity. Type II internal donors are used to increase the molecular weight and reduce the low molecular weight ("LMW") fractions that cause the stickiness typically associated with poly-olefin polymers. It has now been found that some weak Lewis bases, such as certain nitrogen-based donors like 2,6-lutidine and 6-chloro-2-picoline, are effective as Type II donors to increase the molecular weight of polymers without significantly affecting the crystallinity of the polymers produced. Although any internal electron donor is suitable for use in the catalyst, the Type II internal donor is preferably a nitrogen-based Lewis base. The internal donor is more preferably selected from the following: 2,3-dimethylquinoxaline, quinaldine, 2,6-lutidine, 2,4-6-collidine, tetramethylpyrazine, 2,4-dimethylquinoline, 2,6-dichloropyridine, 2-chloroquinoline, 2-chloro-6-methoxypyridine, 2,3-dichloroquinoxaline, 2,4,6-trichloropyrimidine, 2,4,5,6-tetra-chloropyrimidine, 2-chlorolepidine and 6-chloro-2-picoline, and the donor is most preferably 2,6-lutidine, 2,6-dichloropyridine, 6-chloro-2-picoline, or mixtures thereof. The amounts of internal electron donor used is relative to amounts of other ingredients in the catalyst recipe. Therefore, amounts of the various components must be quantified by the molar ratio relative to each other.

The co-catalyst component, which is an organometallic compound, and preferably a metallic alkane free of halogens, may be chosen from organoaluminum compounds. Dialkylaluminum halides and dialkylaluminum alkoxides may be used, but it is preferable to use aluminumtrialkyl compounds, more preferably those wherein each of the alkyl groups has 1 to 6 carbon atoms, e.g., aluminum-trimethyl, aluminumtriethyl, aluminumtri-n-propyl, aluminumtri-isobutyl, aluminumtri-isopropyl and aluminumdibutyl-n-amyl. Alternatively, these may be used in combination with various alkyl aluminum halides, e.g., diethyl aluminum chloride. In the most preferred embodiment, aluminum triethyl is used as the co-catalyst.

The internal modifier silane component has a formula of $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$ alkyl, or a mono- or di-substituted $C_{1-6}$ alkyl. A preferred aryl is $C_{6-22}$ aryl. Preferably, $R_1$ is $C_{6-12}$ cycloalkyl or a mono- or di-substituted $C_{6-12}$ cycloalkyl, $R_2$ is H or methyl, more preferably $R_1$ is an unsubstituted $C_{6-12}$ cycloalkyl, and most preferably is cyclohexyl. $R_2$ is more preferably methyl. $R_3$ and $R_4$ are preferably an unsubstituted $C_{1-6}$ alkyl, more preferably methyl or ethyl, and most preferably methyl. The amount of silane specified above is preferably added by spraying over the halide combination, or some other form of vaporizing, to increase the surface area and contact between the components.

The external modifier may be any silane modifier, but is preferably a silane having a formula of $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl. A preferred aryl is a $C_{6-22}$aryl. Preferably, $R_1$ is $C_{6-12}$ cycloalkyl or a mono- or di-substituted $C_{6-12}$cycloalkyl, $R_2$ is H or methyl, more preferably $R_1$ is an unsubstituted $C_{6-12}$cycloalkyl, and most preferably is cyclohexyl. $R_2$ is more preferably methyl. $R_3$ and $R_4$ are preferably an unsubstituted $C_{1-6}$alkyl, more preferably methyl or ethyl, and most preferably methyl.

Most preferably, the external modifier is identical to the internal modifier used in the pro-catalyst. Increasing the amount of external modifier typically increases the crystallinity in the polymer ultimately produced. The pro-catalyst with co-catalyst in the absence of an external modifier is capable of producing an FPO polymer with a $H_f$ at a lower range of about 4.6 J/g to 60 J/g, preferably around 15 J/g to 30 J/g, and this may be adjusted upward by increasing the amount of external modifier added to the catalyst up to an $H_f$ of about 60 J/g, and every whole integer therebetween. The external modifier may be added in any desired ratio to advantageously provide the desired crystallinity in the FPO polymers, although the molar ratio of Si:Ti (external silane modifier to titanium in the pro-catalyst) will typically be from 0:1 up to about 4:1, and more typically be from 0:1 up to about 1:1. The preferred amount of external modifier is seen in the Examples below, although other useful amounts may be determined by those of ordinary skill in the art after reading this specification.

Besides increasing crystallinity up to a maximum of about 75 J/g, the addition of the external modifier tends to decrease the MFR. An MFR as low as 0.3 g/10 min. may be obtained, although the MFR is typically 0.4 g/10 min. to 60 g/10 min. in the FPO polymers. For example, one experiment with an Si:Ti molar ratio of 0.5:1, and an Al:Ti ratio of 200 (organometallic co-catalyst to pro-catalyst) yielded an MFR of about 3 g/10 min., while an Si:Ti ratio of about 4:1 provided an MFR of about 0.3 g/10 min.

The improved FPO polymers used as the core layer of the films of present invention advantageously have a low crystallinity in the range of about 0.4 Joules per gram (J/g) to 75 J/g, although this may preferably range from about about 4.6 J/g to 35 J/g or 15 J/g to 60 J/g, The polymers also have a melt flow rate of between about 0.4 g/10 min. to 60 g/10 min., and every whole integer therebetween. Preferably, the melt flow rate is between about 2.0 g/10 min. to 30 g/10 min. and every whole integer therebetween, more preferably between about 6.0 g/10 min. to 20 g/10 min., and every whole integer therebetween, and most preferably between about 8.0 g/10 min. to 14.0 g/10 min., and every whole integer therebetween.

While the materials used as core layers according to the instant invention may be prepared using continuous polymerization processes, they may, of course, also be prepared via batch polymerization. When used in continuous polymerization, the catalysts are typically dumped into the reactor in amounts sufficient to replace catalyst used. Polymerization of monomers to produce suitable core layer materials useful in the instant invention including propylene is typically conducted in a polymerization reactor with the catalysts of the invention in a liquid system with an inert diluent such as a paraffinic liquid of 3 to 15 carbon atoms per molecule, or in a liquid system containing propylene as sole diluent or together with a small amount of propane, or in vapor phase. Propylene polymerization in liquid phase is typically conducted at a temperature of about 40° C. to 80° C., more preferably 50° C. to 70° C., and most preferably 55° C. to 65° C., at a pressure sufficient to maintain liquid conditions. Conventional operating conditions for propylene polymerization, other than the novel catalyst preparation and use taught herein, are well known to those skilled in the art and are not essential to the production of the polymers used as the core layer of the film products of the present invention. In a continuous reaction system, the liquid in the reaction zone is maintained at reaction conditions, monomer is continuously charged to the reaction zone, catalyst components are also charged continuously or at frequent intervals to the reaction zone, and reaction mixture containing polymer is withdrawn from the reaction zone continuously or at frequent intervals. For example, 660 mL of propylene batch polymerized with 10 mg of catalyst at 60° C. for about 1 h provided a polymer having a $H_f$ of about 27 J/g and an MFR of about 1.6 g/10 min.

Core Layer Polymer Characterization

It is common knowledge in the art that several different families of propylene-based polymers may be prepared in a polymerization reactor. Some examples of these polymer families include: isotactic propylene homopolymers, isotactic propylene/ethylene copolymers, amorphous poly-α-olefins ("APAO") propylene homopolymers, APAO propylene/ethylene copolymers, APAO propylene/butene copolymers, FPO propylene homopolymers, FPO propylene/ethylene copolymers, and FPO propylene/butene copolymers.

The FPO polymers used as the core layer according to the instant invention are typically propylene homopolymers, but they may also be copolymers of propylene formed from using a monomeric raw material feed comprising propylene in a mixture with at least one other monomeric material, such as a $C_{2-12}$ alkene. The other monomeric raw materials are alpha-olefins in a preferred embodiment, such as ethylene, 1-butene, 1-pentene, and 1-octene. A particularly preferred component for use with propylene is ethylene, present preferably in about 1 to 20 weight percent of the polymer composition. Increasing the ethylene content inhibits the effects of the external donor to varying degrees, i.e., the increase in crystallinity of propylene domains within the polyolefin polymer otherwise seen.

The FPO polymers useful as core layer materials in the instant invention are characterized by a variety of properties, including the degree of crystallinity and the degree of polymerization. Crystallinity, or heat of fusion ($\Delta H_f$) is typically measured by ASTM Method D-3417 (DSC). The relative amounts of the catalyst components described in the catalyst system herein disclosed are capable of being adjusted to produce polymers having a heat of fusion that may range from about 0.4 J/g to 75 J/g, as is illustrated by the data set forth in the various tables. Preferably though, the desired range for purposes of core layer usage is in the range of about 5 J/g to 60 J/g, more preferably about 10 J/g to 30 J/g, and most preferably from about 12 to 25 J/g and a melt flow rate of between about 8.0 to 14 g/10 min. (at 230° C.).

MFR is measured according to ASTM-D1238 standard Method A/B (2.16 kg/230° C.), such as on a Kayness Galaxy I Melt Indexer. The methyl ethyl ketone ("MEK") solution percent was determined by extracting about 5 g of polymer with 100 mL of boiling methyl ethyl ketone for 6 hours. Tensile tests (ASTM-D638) were performed on an Instron 1125 with Type I injection molded tensile bars at test speed of 2"/min. The VICAT softening point was measured in accordance with ASTM-D1525. Shore D hardness was determined in accordance with ASTM-D2240. Percent tensile set was measured after 300 percent extension and calculated by the following equation:

$$\% \text{ Tensile Set} = (L_f - L_i) (L_n - L_i) \times 100\%$$

where $L_i$ is the initial separation, $L_n$ is the extension, and $L_f$ is the final separation. A variety of other characteristics may be used to describe these polymers as well, such as VICAT softening point of about 40° C. to 75° C., and preferably 45° C. to 70° C.; Shore D hardness of about 30 to 65, and more preferably about 40 to 55; tensile modulus; tensile stress; a melt swell ratio of about 1.6 or below, preferably about 1.5 or below, and most preferably about 1.4 or below; and the like. The VICAT softening point and Shore D hardness will vary depending on the melt flow rate, heat of fusion, and the like in the polymer product. The properties vary depending upon the specific FPO polymer produced, which is dependent upon the exact ratios of Al:Ti (co-catalyst to pro-catalyst) and Si:Ti (external modifier to pro-catalyst), as well as the specific silane or other similar compound used in the pro-catalyst and the external modifier. Thus, these polymers are defined primarily by means of their crystallinity, or heat of fusion, their melt flow rate, and their molecular weight distribution, or polydispersity index ("MWD" or "PDI").

The molecular weight distribution, or polydispersity index, of the FPO polymers is about 10 or lower, preferably about 9 or lower, and most preferably about 8.5 or lower. The PDI is a ratio of the molecular weight average ($M_w$) over the molecular number average ($M_n$). The melt swell ratio is measured by the ratio of the diameter of a strand of extruded polymer to the diameter of the orifice through which it was extruded. A lower melt swell ratio is an indicator of a lower PDI, which itself indicates a narrower molecular weight distribution and, therefore, a less sticky, tacky, FPO polymer product. A low PDI combined with a low melt flow rate advantageously provides the polymers used as a core layer in the instant invention with desired characteristics. The low MFR of the FPO polymers tends to evidence a higher melt strength and higher viscosity, which vastly facilitates the production of such as blown films. A low methylethyl ketone-soluble fraction is characteristic of the reduced stickiness associated with the processing of the polymer, both during production and as a final product for consumer or industrial usage. For purposes of this invention, the words "reduced stickiness" mean a polymer comprising about 1 to 12 weight percent of an MEK-soulble fraction. The words "greatly reduced stickiness mean a polymer comprising between about 2 to 5 weight percent of an MEK-soluble fraction.

Various additives may be included in the FPO polymers used as core layer material according to this invention, such as antioxidants, anti-block agents, slip additives, UV stabilizers, pigments, and the like. Adding or removing hydrogen during the polymerization described herein may affect the MFR of the FPO polymers, while having minimal impact on the degree of crystallinity.

EXAMPLES OF CORE LAYER MATERIAL PREPARATION

The suitable core layer materials of this invention are further defined by reference to the following examples describing in detail the preparation of the compounds and compositions useful therefor in the multi-layer film products of the present invention. It will be apparent to those skilled in the art that many modifications, both to materials and methods, may be implemented without departing from the spirit utility of this invention.

A variety of catalysts for the preparation of FPO polymers were prepared and tested, and polymerization tests were conducted. Typical conditions included using liquid polypropylene in a 1.0 L stainless steel autoclave equipped with an agitator. After the reactor was thoroughly purged with nitrogen to remove any catalyst poisons, such as moisture and oxygen, 10 mg of solid pro-catalyst component were charged into the reactor as a 1 weight percent mixture in dry mineral oil, followed by addition of triethylaluminum co-catalyst in a prescribed amount to obtain an Al/Ti molar ratio of about 200:1. 300 g of liquid propylene were then charged into the reactor and the polymerization proceeded at 60° C. for one hour under agitation sufficient to mix the components. At the end of the hour, the unreacted propylene was vented off and the polymer product was recovered. Properties of polymers prepared using various novel catalysts are set forth in the various tables included herein. In the examples, the "C-Donor" is cyclohexyl-methyl-dimethoxy-silane, and "D-Donor" is di-cyclopentyl-dimethoxy-silane.

A conventional catalyst may be prepared according to the disclosure of U.S. Pat. Nos. 4,347,158. Example 1 of the '158 patent describes such a catalyst preparation as follows. Anhydrous $MgCl_2$ was prepared by drying at 350° C. for 4 hours under an HCl blanket. 25 grams of this anhydrous $MgCl_2$, 4.34 g $AlCl_3$, and 7.01 g anisole were charged under nitrogen atmosphere into a vibrating ball mill having a 0.6 L capacity containing 316 stainless steel balls weighing a total of 3250 g and each having a diameter of 12 mm. This mixture was co-comminuted for 24 hours without temperature control. Titanium tetrachloride was precomplexed with ethyl benzoate (EB) in n-heptane at about 50° C. 6.19 g of this $TiCl_4EB$ complex was then charged into the vibrating ball mill after the prior 24 hour co-comminution of the other materials, and the resulting mixture co-comminuted for an additional 20 hours at ambient temperature and under inert atmosphere. This produced a solid catalyst component usable without requiring extraction or catalyst washing.

Another conventional catalyst was prepared, for comparison purposes with the catalysts of the present invention, approximately as follows: 30 g (0.315 mole) of $MgCl_2$ was co-comminuted with 5.22 g (0.0391 mole) $AlCl_3$ for 24 h in RBM under $N_2$ atmosphere. Then 4.02 g (0.0212 mole) of $TiCl_4$ was added. Ball milling was continued for another 24 h. 30 g yellow pro-catalyst powder was collected. It was calculated that the titanium component was about 2.6 weight percent, the aluminum component was about 2.7 weight percent, the magnesium component was about 19.3 weight percent, and the Mg:Al:Ti ratio was about 8:1:0.5.

Examples 3–19 illustrate a variety of Type I donors and their effects on polymer properties. They were typically co-milled with catalyst supports ($MgCl_2/AlCl_3$) prior to $TiCl_4$ addition, except for the catalysts made by a solution process. The effect of the donors produced by the ball-mill method on productivity indicates silane donors are more effective than other donors in enhancing the productivity at low dosages. Those donors prepared by the solution process indicate a productivity enhancement that, with increasing donor dosage, also indicates an increased heat of fusion of the polymer. The desired donors are those that yield the maximum productivity increase while causing the minimum change to the heat of fusion. Silane donors advantageously meet the criteria most effectively.

EXAMPLE 3

Same as Example 6 below, except using 1.18 g EtOBz. Calc'd: Ti%=2.50; EB/Mg=0.025 (mol/mol).

EXAMPLE 4

$MgCl_2$ of 30 g, $AlCl_3$ of 5.25 g and EtOBz of 2.36 g (0.0158 mole) were ball milled (VBM) for 16 h, then $TiCl_4$ of 4.02 g was added and the mixture was ball milled for another 16 h. Calc'n: Ti%=2.43; EB/Mg=0.05 (mol/mol).

EXAMPLE 5

Same as Example 6, except using 4.72 g EtOBz. Calc'd: Ti%=2.31; EB/Mg=0.10 (mol/mol).

EXAMPLE 6

30 g $MgCl_2$ and 5.25 g $AlCl_3$ were ball milled (RBM) for 24 h, then 1.55 g (0.0131 mole) $(EtO)SiMe_3$ and 4.02 g $TiCl_4$ were added. The mixture was ball milled for another 24 h to give the pro-catalyst.

EXAMPLE 7

30 g $MgCl_2$ and 5.25 g $AlCl_3$ were ball milled (RBM) for 24 h, then 3.1 g (0.0263 mole) $(EtO)SiMe_3$ and 4.02 g $TiCl_4$ were added. The mixture was ball milled for another 24 h to give the pro-catalyst.

EXAMPLE 8

30 g $MgCl_2$ and 5.25 g $AlCl_3$ were ball milled (RBM) for 24 h, then 6.15 mL (0.0394 mole) $(EtO)SiMe_3$ and 4.02 g $TiCl_4$ were added. The mixture was ball milled for another 24 h to give the pro-catalyst.

EXAMPLE 9

30 g $MgCl_2$ and 5.25 g $AlCl_3$ were ball milled (RBM) for 24 h, then 2.47 g (0.0131 mole) C-donor and 4.02 g $TiCl_4$ were added. The mixture was ball milled for another 24 h to give the pro-catalyst.

EXAMPLE 10

30 g $MgCl_2$ and 5.25 g $AlCl_3$ were ball milled (RBM) for 24 h, then 7.42 g (0.0394 mole) C-donor and 4.02 g $TiCl_4$ were added. The mixture was ball milled for another 24 h to give the pro-catalyst.

EXAMPLE 11

30 g $MgCl_2$ and 5.25 g $AlCl_3$ were ball milled (RBM) for 24 h, then 3.0 g (0.0131 mole) D-donor and 4.02 g $TiCl_4$ were added. The mixture was ball milled for another 24 h to give the pro-catalyst.

EXAMPLE 12

30 g $MgCl_2$ and 5.25 g $AlCl_3$ were ball milled (RBM) for 24 h, then 9.0 g (0.0394 mole) D-donor and 4.02 g $TiCl_4$ were added. The mixture was ball milled for another 24 h to give the pro-catalyst.

EXAMPLE 13

5 g of Example 2 was suspended in 100 mL toluene, stirred at 60° C. for 1 h, filtered and suspended in 30 mL fresh toluene. 16.5 mL $TiCl_4$ and 0.74 mL (3.2 mmole) D-donor (Dicyclopentyldimethoxysilane) were added. Mixture was stirred at 90° C. for 1 h, filtered (solid dark brown), washed with heptane (turned to greenish yellow) and toluene (back to dark brown), again suspended in 30 mL toluene. 17 mL $TiCl_4$ was charged and mixture was stirred at 90° C. for another 1 h. Solid filtered out and thoroughly washed with heptane.

EXAMPLE 14

1) $MgCl_2$ 30 g, $AlCl_3$ 5.25 g and $(EtO)_3SiMe$ 7.02 g (0.0394 mole) were ball milled for 24 h. 2) 5 g of above precursor was suspended in 100 mL toluene, stirred at 60° C. for 1 h, filtered, solid washed with heptane, toluene and then suspended in 30 mL fresh toluene. 16.5 mL (150 mmole) $TiCl_4$ was charged (slurry turned brown). The slurry was stirred at 90° C. for 1 h, filtered, solid washed with heptane, toluene, then again suspended in 30 mL toluene. 16.5 mL $TiCl_4$ was charged and reacted at 90° C. for 1 h. The solid was washed with heptane. The solid was orange-red in toluene but turned to yellow after washed by heptane.

EXAMPLE 15

30 g $MgCl_2$ and 5.25 g $AlCl_3$ were ball milled (RBM) for 24 h, then 6.69 g (0.0394 mole) $SiCl_4$ and 4.02 g $TiCl_4$ were added. The mixture was ball milled for another 24 h to give the pro-catalyst.

EXAMPLE 16

30 g $MgCl_2$, 5.25 g $AlCl_3$ and 2.76 g dibutyl phthalate were co-ball milled for 24 h, then 4.02 g $TiCl_4$ was added. The mixture was ball milled for another 24 h to provide the pro-catalyst.

EXAMPLE 17

30 g $MgCl_2$ and 2.76 g dibutyl phthalate were co-ball milled for 24 h, then 4.02 g $TiCl_4$ was added. The mixture was ball milled for another 24 h to provide the pro-catalyst.

EXAMPLE 18

30 g $MgCl_2$ and 5.25 g $AlCl_3$ were ball milled (RBM) for 24 h, then 7.68 g (0.0212 mole) diheptyl phthalate and 4.02 g (0.0212 mole) $TiCl_4$ were charged and ball milled for another 24 h.

EXAMPLE 19

Same as Example 14 except without $(EtO)_3SiMe$ but with dropwise addition of 1.17 mL diheptyl phthalate (turned dark) before reacting at 90° C. for 1 h.

These pro-catalysts were used in a catalyst for the polymerization of polypropylene to produce polymers having characteristics set forth in the Tables.

A variety of catalysts were examined for Type II internal donor characteristics in an attempt to locate a catalyst that produces a smaller amount of the low molecular weight FPO polymers than typical.

EXAMPLE 20

See Example 2.

EXAMPLE 21

30 g $MgCl_2$ and 5.25 g $AlCl_3$ were ball milled (RBM) for 24 h, then 4.46 g (0.0394 mole) cis 2,6-dimethylpiperidine and 4.02 g $TiCl_4$ were added. The mixture was ball milled for another 24 h to give the pro-catalyst.

EXAMPLE 22

30 g $MgCl_2$ and 5.25 g $AlCl_3$ were ball milled (RBM) for 24 h, then 5.56 g (0.0393 mole) 2,2,6,6-tetramethylpiperidine and 4.02 g $TiCl_4$ were added. The mixture was ball milled for another 24 h to give the pro-catalyst.

EXAMPLE 23

30 g $MgCl_2$ and 5.25 g $AlCl_3$ were ball milled (RBM) for 24 h, then 4.19 mL (0.0394 mole) 2,5-dimethylfuran and 4.02 g $TiCl_4$ were added. The mixture was ball milled for another 24 h to give the pro-catalyst.

EXAMPLE 24

30 g $MgCl_2$ and 5.25 g $AlCl_3$ were ball milled (RBM) for 24 h, then 3.95 g (0.0394 mole) 2,5-dimethyltetrafuran and 4.02 g $TiCl_4$ were added. The mixture was ball milled for another 24 h to give the pro-catalyst.

EXAMPLE 25

30 g $MgCl_2$ and 5.25 g $AlCl_3$ were ball milled (RBM) for 24 h, then 3.67 g (0.0394 mol) 2-picoline and 4.02 g $TiCl_4$ were added. The mixture was ball milled for another 24 h to give the pro-catalyst.

EXAMPLE 26

21.4 g $MgCl_2$ and 3.75 g $AlCl_3$ were ball milled (RBM) for 24 h, then 5.0 g (0.0281 mole) 4-chloroquinaldine and 2.85 g TiCl4 were added. The mixture was ball milled for another 24 h to give the pro-catalyst.

EXAMPLE 27

30 g $MgCl_2$ and 5.25 g $AlCl_3$ were ball milled (RBM) for 24 h, then 4.59 mL (0.0394 mole) 2,6-Lutidine and 4.02 g $TiCl_4$ were added. The mixture was ball milled for another 24 h to give the pro-catalyst.

EXAMPLE 28

30 g $MgCl_2$ and 5.25 g $AlCl_3$ were ball milled (RBM) for 24 h, then 4.77 g (0.0393 mole) 2,4,6-collidine and 4.02 g $TiCl_4$ were added. The mixture was ball milled for another 24 h to give the pro-catalyst.

EXAMPLE 29

30 g $MgCl_2$ and 5.25 g $AlCl_3$ were ball milled (RBM) for 24 h, then 5.0 g (0.0394 mole) 6-chloro-2-picoline and 4.02 g $TiCl_4$ were added. The mixture was ball milled for another 24 h to give the pro-catalyst.

EXAMPLE 30

30 g $MgCl_2$ and 5.25 g $AlCl_3$ were ball milled (RBM) for 24 h, then 5.83 g (0.0393 mole) 2,6-dichloropyridine and 4.02 g $TiCl_4$ were added. The mixture was ball milled for another 24 h to give the pro-catalyst.

EXAMPLE 31

30 g $MgCl_2$ and 5.25 g $AlCl_3$ were ball milled (RBM) for 24 h, then 9.33 g (0.0394 mol) 2,6-dibromopyridine and 4.02 g $TiCl_4$ were added. The mixture was ball milled for another 24 h to give the pro-catalyst.

TABLE I properties of examples 1–10

| Example Number | Composition | Donor | Donor/Ti | Polymn. Run No. | C.E. g/g-cat | $\Delta H_f$ J/g | m.p. °C. | MFR g/10 min | MEK sol % |
|---|---|---|---|---|---|---|---|---|---|
| 1 | $TiCl_4/MgCl_2/AlCl_3$/EB/Anisole | EB & Anisole | nd | 2507-39 | 11900 | 42.9 | 155.9 | 11 | nd |
| 2 | $TiCl_4/MgCl_2/AlCl$ (BM) | None | 0 | 2536-1 | 16500 | 30 | 154 | 11 | 11 |
| 3 | $TiCl_4/MgCl_2/AlCl_3$/EB (BM) | Ethyl Benzoate | 0.37 | 2536-25 | 17600 | 31.8 | 153.8 | 10.3 | 12.5 |
| 4 | $TiCl_4/MgCl_2/AlCl_3$/EB (BM) | Ethyl Benzoate | 0.74 | 2536-21 | 18500 | 35.1 | 154.5 | 9.6 | 11.1 |
| 5 | $TiCl_4/MgCl_2/AlCl_3$/EB (BM) | Ethyl Benzoate | 1.48 | 2536-27 | 13800 | 39.2 | 154.7 | 7.4 | 12.2 |
| 6 | $TiCl_4/MgCl_2/AlCl_3$/(EtO)$SiMe_3$ (BM) | (EtO)$SiMe_3$ | 0.62 | 2540-31 | 18800 | 36.1 | 153.9 | 8.4 | 10.4 |
| 7 | $TiCl_4/MgCl_2/AlCl_3$/(EtO)$SiMe_3$ (BM) | (EtO)$SiMe_3$ | 1.24 | 2536-99 | 23300 | 39.6 | 153.5 | 8.9 | 7.6 |
| 8 | $TiCl_4/MgCl_2/AlCl_3$/(EtO)$SiMe_3$ (BM) | (EtO)$SiMe_3$ | 1.86 | 2536-97 | 21000 | 43.9 | 152.4 | 15.3 | 7.8 |
| 9 | $TiCl_4/MgCl_2/AlCl_3$/C-donor (BM) | C-donor | 0.62 | 2540-7 | 19400 | 33.7 | 153.1 | 8.6 | 7.8 |
| 10 | $TiCl_4/MgCl_2/AlCl_3$/C-donor (BM) | C-donor | 1.86 | 2536-95 | 13400 | 40.9 | 152.8 | 7.5 | 5.5 |

TABLE II

Properties of Examples 11–19

| Example Number | Composition | Donor | Donor/Ti | Polymn. Run No. | C.E. g/g-cat | $\Delta H_f$ J/g | m.p. °C. | MFR g/10 min | MEK sol % |
|---|---|---|---|---|---|---|---|---|---|
| 11 | $TiCl_4/MgCl_2/AlCl_3$/D-donor (BM) | D-donor | 0.62 | 2540-6 | 19800 | 35.9 | 153.7 | 9.9 | 5.7 |
| 12 | $TiCl_4/MgCl_2/AlCl_3$/D-donor (BM) | D-donor | 1.86 | 2536-93 | 13800 | 36.9 | 154.4 | 3.6 | 4.7 |
| 13 | $TiCl_4/MgCl_2/AlCl_3$/D-donor (Solution) | D-donor | nd | 2536-62 | 27300 | 37.7 | 154.2 | 12.7 | 9.4 |
| 14 | $TiCl_4/MgCl_2/AlCl_3$/(EtO)$_3$SiMe (Solution) | (EtO)$_3$SiMe | nd | 2536-54 | 18200 | 51.1 | 155.2 | 4.6 | 7.9 |
| 15 | $TiCl_4/MgCl_2/AlCl_3/SiCl_4$ (BM) | $SiCl_4$ | 1.86 | 2536-91 | 17500 | 34.2 | 153.6 | 13.7 | 7.1 |
| 16 | $TiCl_4/MgCl_2/AlCl_3$/DBP (BM) | Dibutyl Phthalate | 0.47 | 2541-59 | 13900 | 46.9 | 156.0 | 4.2 | 8.4 |
| 17 | $TiCl_4/MgCl_2$/DBP (BM) | Dibutyl Phthalate | 0.47 | 2541-62 | 9900 | 44.2 | 155.4 | 4.0 | 6.8 |
| 18 | $TiCl_4/MgCl_2/AlCl_3$/DHP (BM) | Diheptyl Phthalate | 1 | 2536-58 | 10700 | 49.7 | 156.1 | 0.75 | 4.5 |
| 19 | $TiCl_4/MgCl_2/AlCl_3$/DHP (Solution) | Diheptyl Phthalate | nd | 2536-56 | 9700 | 49.7 | 156.7 | 1.2 | 7.1 | nd = not determined
Polymerization conditions: 10 mg catalyst; 300 g propylene: Al/Ti = 200; 60° C. for 1 hour.

TABLE III

| Example No.[a] | Donor | Polymn Run No[b] | C.E. g/g-cat.h | ΔH$_f$ J/g | M.P. °C. | MFR g/10 min | MEK Sol % | M$_n$ ×10−3 | M$_w$ ×10−3 | PDI |
|---|---|---|---|---|---|---|---|---|---|---|
| 20 | None | 2536-1 | 16500 | 30 | 154 | 11 | 11 | 21 | 209 | 9.9 |
| 21 | 2,6-dimethylpiperidine | 2536-79 | 7900 | 35.9 | 154.3 | 4.0 | 6.0 | 28 | 239 | 8.47 |
| 22 | 2,2,6,6-Tetramethylpiperidine | 2540-51 | 7400 | 51.1 | 156.4 | 0.68 | 5.9 | 33 | 385 | 12.2 |
| 23 | 2,5-dimethylfuran | 2536-76 | 14000 | 35.1 | 154.1 | 6.4 | 8.4 | 27 | 277 | 9.6 |
| 24 | 2,5-dimethyl-tetrahydrofuran | 2536-80 | 14700 | 28.4 | 153.6 | 18.4 | 9.2 | 20 | 201 | 9.9 |
| 25 | 2-picoline | 2540-84 | 13700 | 27.8 | 153.6 | 7.3 | 11.0 | 22 | 214 | 9.7 |
| 26 | 4-chloroquinaldine | 2536-86 | 6500 | 30.2 | 154.4 | 3.6 | 7.6 | 25 | 239 | 9.4 |
| 27 | 2,6-Lutidine | 2536-68 | 6800 | 27.5 | 155.0 | 1.4 | 4.8 | 36 | 283 | 7.8 |
| 28 | 2,4,6-collidine | 2540-37 | 9000 | 29.7 | 154.7 | 1.22 | 4.62 | | | |
| 29 | 6-chloro-2-picoline | 2536-83 | 9300 | 27.5 | 154.5 | 1.2 | 3.8 | 36 | 280 | 7.8 |
| 30 | 2,6-dichloropyridine | 2540-35 | 9100 | 26.9 | 154.4 | 3.1 | 8.1 | 32 | 265 | 8.29 |
| 31 | 2,6-dibromopyridine | 2540-86 | 9300 | 27.6 | 153.6 | 2.1 | 8.9 | 29 | 295 | 10.3 |

[a]Catalyst general composition: TiCl$_4$/MgCl$_2$/AlCl$_3$/Donor, ball milled, Donor/Ti = 1.86.
[b]Polymerization conditions: 10 mg catalyst; Al/Ti = 200; 60° C. for 1 h.

Examples 20–31 illustrate a variety of Type II donors, including aromatic, sterically hindered nitrogen-based Lewis base donors. It was desired to obtain a higher molecular weight indicated by a lower MFR, while having a minimal effect on crystallinity. The results above suggest that: (1) the nitrogen-based donors are generally more effective in increasing molecular weight than oxygen-based donors (Examples 23 and 24, for example); (2) non-aromatic nitrogen-based Lewis bases, e.g., Examples 21 and 22, had a more pronounced effect on polymer heat of fusion than the aromatic derivatives, the latter being weaker Lewis bases; and (3) the steric hindrance around the nitrogen atom importantly appears to increase steric hindrance from 2-picoline to 2,6-lutidine to 2,6-dibromopyridine, with the low molecular weight fractions first decreased, then increased again. 2,6-lutidine and 6-chloro-2-picoline were more effective in reducing the LMW fractions.

A variety of catalysts were prepared and tested to obtain a good productivity, while yielding higher molecular weight and lower crystallinity:

EXAMPLE 32

30 g MgCl$_2$ and 5.25 g AlCl$_3$ were ball milled (RBM) for 5 h, 1.55 g (0.0131 mole) (EtO)SiMe$_3$ was added and ball milled for 19 h, then 4.22 g (0.0394 mole) 2,6-Lutidine and 4.02 g TiCl$_4$ were added. The mixture was ball milled for another 24 h to give the pro-catalyst.

EXAMPLE 33

30 g MgCl$_2$ and 5.25 g AlCl$_3$ were ball milled (RBM) for 24 hrs., then 3.1 g (0.026 mole) (EtO)SiMe$_3$ and 4.02 g TiCl$_4$ were added. The mixture was ball milled for another 24 hrs. 10 g of this mixture were suspended in 30 mL toluene, to which 33 mL TiCl4 and 0.75 mL (0.0064 mole) 2,6-Lutidine were added. The mixture was stirred at 90° C. for 1 h, then filtered (filtrate orange) and washed with heptane for 3 times to give the yellow pro-catalyst.

EXAMPLE 34

30 g MgCl$_2$, 5.25 g AlCl$_3$ and 0.74 g diethoxydimethylsilane were co-ball milled for 24 h, then 1.41 g 2,6-Lutidine and 4.02 g TiCl$_4$ were added. The mixture was ball milled for another 24 h to give the pro-catalyst.

EXAMPLE 35

30 g MgCl$_2$, 5.25 g AlCl$_3$ and 0.95 g C-donor were ball milled (RBM) for 24 h, then 1.41 g (0.0131 mol) 2,6-Lutidine and 4.02 g TiCl$_4$ were added. The mixture was ball milled for another 24 h to give the pro-catalyst.

EXAMPLE 36

30 g MgCl$_2$, 5.25 g AlCl$_3$ and 1.23 g dicyclopentyldimethoxysilane were ball milled for 24 h, then 1.41 g 2,6-Lutidine and 4.02 g TiCl$_4$ were added. The mixture was ball milled for another 24 h to give the pro-catalyst.

EXAMPLE 37

30 g MgCl$_2$, 5.25 g AlCl$_3$ and 1.38 dibutyl phthalate were ball milled for 24 h, then 1.41 g 2,6-lutidine and 4.02 g TiCl$_4$ were added. The mixture was ball milled for another 24 h to give the pro-catalyst.

EXAMPLE 38

30 g MgCl$_2$, 5.25 g AlCl$_3$ and 0.95 g C-donor were ball milled (RBM) for 24 h, then 1.66 g (0.0131 mol) 6-chloro-2-picoline and 4.02 g TiCl$_4$ were added. The mixture was ball milled for another 24 h to give the pro-catalyst.

EXAMPLE 39

30 g MgCl$_2$, 5.25 g AlCl$_3$ and 0.95 g C-donor were ball milled (RBM) for 24 h, then 3.32 g (0.0262 mol) 6-chloro-2-picoline and 4.02 g TiCl$_4$ were added. The mixture was ball milled for another 24 h to give the pro-catalyst.

EXAMPLE 40

5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.1 mL (0.0005 mole) C-donor were added into the suspension. The mixture was then stirred at 90° C. for 1 h, filtered and washed with heptane then toluene. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

EXAMPLE 41

5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.25 mL (0.001 mole) D-donor were added into the suspension. The mixture was then stirred at 90° C. for 1 h, filtered and washed with heptane twice. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

EXAMPLE 42

5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.1 mL (0.0004 mole) D-donor were added into the suspension. The mixture was then stirred at 90° C. for 1 h, filtered and washed with heptane then toluene. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

EXAMPLE 43

30 mg MgCl$_2$ and 5.25 g AlCl$_3$ were ball milled (RBM) for 24 hrs., then 1.55 g (0.013 mole) (EtO)SiMe$_3$ and 4.02 g TiCl$_4$ were added. The mixture was ball milled for another 24 hrs. 5 g of this mixture was suspended in 100 mL toluene and stirred at 80° C. for 1 h. The solid was filtered out and re-suspended in 30 mL toluene. 16.5.mL TiCl$_4$ and 0.41 g (0.0032 mole) 6-chloro-2-picoline were added into the suspension. The mixture was then stirred at 90° C. for 1 h, filtered and washed with heptane for three times to give the pro-catalyst.

EXAMPLE 44

5 g of the mixture of Example 43 was suspended in 100 mL toluene and stirred at 80° C. for 1 h. The solid was filtered out and re-suspended in 30 mL toluene. 16.5 mL TiCl$_4$ and 0.0032 mole 2,6-dichloropyridine (dissolved in toluene) were added into the suspension. The mixture was then stirred at 90° C. for 1 h, filtered and washed with heptane for three times to give the pro-catalyst.

| Example Number | A-type Donor (Donor/Ti) | B-type Donor (Donor/Ti) | Polymn. Run No | C.E. g/g-cat. h | $\Delta H_f$ J/g | M.P. ° C. | MFR g/10 min | MEK Sol % |
|---|---|---|---|---|---|---|---|---|
| 32 (BM) | (EtO)SiMe3 Si/Ti = 0.62 | 2,6-Lutidine N/Ti = 1.86 | 2540-24 | 4500 | 36.8 | 153.5 | 1.2 | 7.1 |
| 33 (solution) | (EtO)SiMe3 Si/Ti nd | 2,6-Lutidine N/Ti nd | 2540-39 | 10900 | 42.6 | 155.3 | 1.3 | 4.4 |
| 34 (BM) | (EtO)2SiMe2 Si/Ti = 0.23 | 2,6-Lutidine N/Ti = 0.62 | 2541-53 | 14300 | 36.6 | 154.2 | 1.9 | 7.2 |
| 35 (BM) | C-donor Si/Ti = 0.23 | 2,6-Lutidine N/Ti = 0.62 | 2540-91 | 15500 | 28.3 | 152.9 | 1.6 | 8.0 |
| 36 (BM) | D-donor Si/Ti = 0.23 | 26-Lutidine N/Ti = 0.62 | 2541-51 | 14000 | 38.3 | 154.5 | 1.3 | 5.3 |
| 37 (BM) | Dibutyl phthalate DBP/Ti = 0.23 | 2,6-Lutidine N/Ti = 0.62 | 2541-23 | 10500 | 32.9 | 154.5 | nd | 7.4 |
| 38 (BM) | C-donor Si/Ti = 0.23 | 6-chloro-2-picoline N/Ti = 0.62 | 2540-96 | 14700 | 29.6 | 153.7 | 3.1 | 7.4 |
| 39 (BM) | C-donor Si/Ti = 0.23 | 6-chloro-2-picoline N/Ti = 1.24 | 2540-98 | 10500 | 27.8 | 153.8 | 1.2 | 7.0 |
| 40 (solution) | C-donor Si/Ti n.d. | 6-chloro-2-picoline N/Ti n.d. | 2540-77 | 9300 | 26.7 | 154.1 | 1.0 | 6.5 |
| 41 (solution) | D-donor Si/Ti n.d | 6-chloro-2-picoline N/Ti n.d. | 2540-53 | 15700 | 29.7 | 153.3 | 1.8 | 5.7 |
| 42 (solution) | D-donor Si/Ti n.d. | 6-chloro-2-picoline N/Ti n.d. | 2540-67 | 9700 | 28.1 | 155.0 | 1.7 | 5.7 |
| 43 (solution) | (EtO)SiMe3 Si/Ti n.d. | 6-chloro-2-picoline N/Ti n.d. | 2540-47 | 8300 | 35.7 | 155.4 | 1.0 | 6.8 |
| 44 (solution) | (EtO)SiMe3 Si/Ti n.d. | 2,6-dichloropyridine N/Ti n.d. | 2540-49 | 19100 | 36.1 | 154.1 | 4.2 | 6.9 |

The goal of Examples 32–44 was to obtain a catalyst with good productivity, while yielding higher molecular weight and lower crystallinity. Examples 32–44 illustrate the combinations of these donors by both ball mill and solution process. It appeared that the most promising combinations are those between C-donor, D-donor and 2,6-Lutidine, 6-chloro-2-picoline. D-donor and 2,6-Lutidine seemed to cause slightly higher heat of fusion. Also, the solution process appeared less advantageous as compared to the ball mill process.

Likely candidates for catalysts having all desired properties were selected to optimize all characteristics in the catalyst and resulting FPO polymer:

EXAMPLE 45

30 g MgCl$_2$ and 5.25 g AlCl$_3$ were ball milled (RBM) for 24 h, then 4.59 mL (0.0394 mole) 2,6-Lutidine and 4.02 g TiCl$_4$ were added. The mixture was ball milled for another 24 h to give the pro-catalyst.

EXAMPLE 46

30 g $MgCl_2$ and 5.25 g $AlCl_3$ were ball milled (RBM) for 24 h, then 2.81 g (0.0262 mol) 2,6-Lutidine and 4.02 g $TiCl_4$ were added. The mixture was ball milled for another 24 h to give the pro-catalyst.

EXAMPLE 47

30 g $MgCl_2$ and 5.25 g $AlCl_3$ were ball milled (RBM) for 24 h, then 1.41 g (0.0131 mol) 2,6-Lutidine and 4.02 g $TiCl_4$ were added. The mixture was ball milled for another 24 h to give the pro-catalyst.

EXAMPLE 48

30 g $MgCl_2$ and 5.25 g $AlCl_3$ were ball milled (RBM) for 24 h, then 0.74 g (0.0069 mol) 2,6-Lutidine and 4.02 g $TiCl_4$ were added. The mixture was ball milled for another 24 h to give the pro-catalyst.

EXAMPLE 49

30 g $MgCl_2$ and 5.25 g $AlCl_3$ were ball milled (RBM) for 24 h, then 1.41 g (0.0131 mol) 2,6-Lutidine and 8.04 g $TiCl_4$ were added. The mixture was ball milled for another 24 h to give the pro-catalyst.

EXAMPLE 50

30 g $MgCl_2$, 5.25 g $AlCl_3$ and 0.95 g C-donor were ball milled (RBM) for 24 h, then 1.41 g (0.0131 mol) 2,6-Lutidine and 8.04 g $TiCl_4$ were added. The mixture was ball milled for another 24 h to give the pro-catalyst.

EXAMPLE 51

30 g $MgCl_2$, 5.25 g $AlCl_3$ and 0.48 g C-donor were ball milled (RBM) for 24 h, then 1.41 g (0.0131 mol) 2,6-Lutidine and 4.02 g $TiCl_4$ were added. The mixture was ball milled for another 24 h to give the pro-catalyst.

EXAMPLE 52

30 g $MgCl_2$, 5.25 g $AlCl_3$ and 0.95 g C-donor were ball milled (RBM) for 24 h, then 1.41 g (0.0131 mol) 2,6-Lutidine and 4.02 g $TiCl_4$ were added. The mixture was ball milled for another 24 h to give the pro-catalyst.

EXAMPLE 53

30 g $MgCl_2$, 5.25 g $AlCl_3$ and 1.43 g C-donor were ball milled (RBM) for 24 h, then 1.41 g (0.0131 mol) 2,6-Lutidine and 4.02 g $TiCl_4$ were added. The mixture was ball milled for another 24 h to give the pro-catalyst.

Examples 45–53 illustrate the optimization of donor dosage by locating a point where the MFR is sufficiently low, but catalyst productivity is acceptably high for polymerization, as well as the optimization of maintaining improved productivity while obtaining low heat of fusion. Example 52 appears as the pro-catalyst advantageously having the optimum recipe, with a relatively high productivity of 15,500 g/g catalyst, relatively low $H_f$ of about 28.3 J/g, and significantly lower MFR of about 1.6 g/10 min. than for other catalyst formulations.

EXAMPLE 54—preferred catalyst 120 lbs. of solid magnesium chloride ("$MgCl_2$") and 21 lbs. of solid aluminum chloride ("$AlCl_3$") were charged to a 250 L vibratory ball mill and mixed for about 15 minutes. Then, 3.8 lbs. of cyclohexylmethyldimethoxysilane was sprayed into the stainless steel container. The mixture was then ball milled for 16 hours at room temperature. Subsequent to the initial ball milling, 3.7 lbs. of liquid 2,6-lutidine and 16.1 lbs. of liquid titanium tetrachloride ($TiCl_4$) were added to the mixture. An alternative heterocyclic aromatic amine, such as about 4.5 lbs. of liquid 6-chloro-2-picoline could instead have been substituted. The lutidine was directly added to these components. The five (5) components were then ball milled for about an additional 16 hours. The ball milling involves vibrating steel balls to pound the component particles, imparting heat to the ball milling vessel; however, the vessel was equipped with a heat-exchanger to maintain approximately room temperature during the ball milling.

In the preparation of a variety of FPO polymers, the productivity of the present catalyst has ranged from about a 30 to 55 percent increase, compared to conventional catalysts.

EXAMPLES 55–62—pilot plant continuous process—

Polymers were prepared in a large scale continuous pilot plant operation, wherein monomers, hydrogen, and catalyst components were separately and continuously charged to a stirred reactor. The total monomer feed rate corresponded to about a 1.8 hour residence time in the reactor. Triethylaluminum ("TEA") and external modifier cyclohexylmeth-

TABLE V

| Example No. | Ti % | C-donor (Si/Ti) | 2,6-Lutidine (N/Ti) | Polymn. Run No. | C.E. g/g-cat.h | $\Delta H_f$ J/g | M.P. ° C. | MFR g/10 min | MEK Sol % | $M_n$ ×10-3 | $M_w$ ×10-3 | PDI |
|---|---|---|---|---|---|---|---|---|---|---|---|---|
| 45 | 2.33 | 0 | 1.86 | 2540-1 | 6400 | 31.8 | 154.8 | 1.5 | 6.8 | 36 | 283 | 7.78 |
| 46 | 2.41 | 0 | 1.24 | 2540-71 | 8800 | 27.4 | 154.2 | 1.6 | 7.2 | 40 | 299 | 7.45 |
| 47 | 2.50 | 0 | 0.62 | 2540-75 | 12700 | 27.3 | 153.4 | 1.9 | 6.9 | 32 | 273 | 8.4 |
| 48 | 2.54 | 0 | 0.32 | 2540-82 | 15900 | 29.5 | 152.6 | 3.2 | 10.1 | 26 | 247 | 9.41 |
| 49 | 4.54 | 0 | 0.31 | 2540-80 | 126000 | 32.7 | 154.6 | 1.9 | 6.6 | 31 | 242 | 7.74 |
| 50 | 4.47 | 0.118 | 0.31 | 2540-89 | 15100 | 38.8 | 154.0 | 2.4 | 5.5 | 36 | 263 | 7.37 |
| 51 | 2.47 | 0.118 | 0.62 | 2541-6 | 14300 | 29.5 | 153.6 | 2.3 | 8.0 | | | |
| 52 | 2.44 | 0.23 | 0.62 | 2540-91 | 15500 | 28.3 | 152.9 | 1.6 | 8.0 | 32 | 274 | 8.48 |
| 53 | 2.41 | 0.35 | 0.62 | 2541-8 | 15000 | 37.1 | 153.5 | 1.8 | 5.9 | | | | yldimethoxysilane ("CMDS") were pumped into the reactor as about 5 weight percent and 0.25 weight percent heptane solutions, respectively. The solid catalyst component had a titanium content of about 2.2 weight percent and was prepared according to Example 54. The solid catalyst component was pumped into the reactor as a 25 weight percent mixture in petrolatum. The catalyst components were added at rates directly proportional to the polymer production rates, and in amounts sufficient to maintain the polymer solids concentration in the reactor slurry at values typically in the range of about 30 to 50 weight percent. The catalyst productivity (lbs polymer/lb solid catalyst) was calculated from the polymer solids withdrawal rate and the solid catalyst component addition rate. The product polymers were separated from unreacted monomers, deactivated, stabilized, and pelletized, followed by testing to determine polymer characteristics. Table VI. summarizes the pertinent operating conditions and results of the physical testing of the polymer characteristics.

TABLE VI

| Example | 55 | 56 | 57 | 58 | 59 | 60 | 61 | 62 |
|---|---|---|---|---|---|---|---|---|
| Reactor Temp ° F. | 135 | 135 | 135 | 135 | 135 | 135 | 140 | 140 |
| Propylene (lbs/hr) | 138 | 154 | 136 | 146 | 142 | 147 | 147 | 135 |
| Ethylene (lbs/hr) | — | — | 1.5 | 1.1 | — | — | — | — |
| Hydrogen (lbs/hr) | — | 0.028 | — | 0.028 | 0.026 | 0.040 | 0.027 | 0.04 |
| Solid catalyst (lbs/hr) | 0.0045 | 0.0038 | 0.0029 | 0.0026 | 0.0045 | 0.0048 | 0.0055 | 0.0046 |
| Al/Ti mol ratio | 162 | 210 | 256 | 364 | 155 | 184 | 161 | 191 |
| CMDS/Ti mol ratio | — | — | — | — | 0.77 | 0.87 | 2 | 2 |
| Productivity (lbs/hr) | 9880 | 11600 | 16110 | 16890 | 9630 | 10420 | 8480 | 10090 |
| Ethylene-wt % | — | — | 2.2 | 2.6 | — | — | — | — |
| $\Delta H_f$ (J/g) | 26.6 | 23.8 | 17.8 | 18.2 | 33.5 | 36.1 | 50.4 | 53.4 |
| MFR (g/10 min) | 4.6 | 13.6 | 4.9 | 15.8 | 7.4 | 30 | 4.8 | 25.9 |
| Tensile Modulus (kpsi) | 11 | 9 | 5 | 3 | 20 | 20 | 40 | 43 |
| Tensile stress @ 311% strain-psi | 1330 | 935 | 983 | 660 | 1400 | 1087 | 2100 | 1720 |
| % Tensile set, 0/24 hr | 36/23 | 34/19 | 31/17 | 30/17 | 46/31 | 45/29 | 63/45 | 69/50 |
| VICAT softening (° C.) | 58 | 46 | 41 | 42 | 66 | 57 | 95 | 97 |
| Shore D Hardness | 46 | 45 | 38 | 34 | 51 | 50 | 61 | 62 |

The polymerization of several polymers, which are by no means indicative of the broad scope of polymers this invention is meant to encompass, was examined using the ball-milled catalyst of the present invention. The characteristics of some of these polymers are set forth in Table VII:

TABLE VII

| Example No. | 63 | 64 | 65 | 66 | 67 | 68 | 69 | 70 | 71 |
|---|---|---|---|---|---|---|---|---|---|
| Pro-cat., mg | 10 | 10 | 10 | 10 | 10 | 10 | 10 | 10 | 10 |
| Co-catalyst | TEA | TEA | TEA | TEA | TEA | TEA | TEA | TEA | TEA |
| Al/Ti, mol/mol | 200 | 200 | 200 | 200 | 200 | 200 | 200 | 200 | 200 |
| Modifier | | CMDS | | CMDS | | | | | |
| Modifier/Ti, mol/mol | | 1 | | 1 | | | | | |
| $H_2$, psig | 0 | 0 | 5 | 5 | 0 | 0 | 0 | 0 | 0 |
| Ethylene, g/min[a] | 0 | 0 | 0 | 0 | 0.27 | 0 | 0 | 0 | 0 |
| Propylene, mL | 660 | 660 | 660 | 660 | 660 | 610 | 460 | 610 | 460 |
| 1-butene, mL | 0 | 0 | 0 | 0 | 0 | 50 | 200 | 0 | 0 |
| 1-pentene, mL | 0 | 0 | 0 | 0 | 0 | 0 | 0 | 50 | 200 |
| C.E. g/g cat/h | 15300 | 10400 | 17500 | 13100 | 19600 | 11000 | 10600 | 9400 | 8000 |
| H.F., J/g | 32.2 | 57.2 | 34.8 | 62.7 | 25.6 | 21.8 | 13.8 | 21.9 | 6.6 |
| m.p, ° C. | 153.7 | 156.4 | 155.9 | 158.3 | 146.7 | 137.3 | 109.7 | 141.0 | 126.9 |
| MFR, g/10 min | 2.16 | 0.3 | 12.0 | 21.9 | 2.24 | 4.1 | 6.3 | 4.4 | 10.2 |

Batch polymerization in 1 liter autoclave, 60° C., for 1 hr
[a]Ethylene continuously fed during 1 hour reaction time.

Each of the polymer products in Examples 72 to 83 set forth in Table VII were prepared in general by the process described in the Examples above. Initially, a clean one-Liter stainless steel autoclave reactor equipped with an agitator was purged with nitrogen to remove impurities. Next, triethylaluminum is added to the reactor in sufficient quantity to provide an Al:Ti atomic ratio of about 200:1 when followed by addition of a mineral oil suspension containing about 10 mg of solid procatalyst as described herein. The mixed monomer charges, which include 660 mL liquid volume, were subsequently introduced into the reactor at an effective pressure and under thermal control to maintain a reaction temperature of 60° C. for one hour. The "C" and "D" donors were those used previously. After one hour, the unreacted monomer was vented off and the polymer product was recovered using conventional techniques.

TABLE VIII

| Example No. | 72 | 73 | 74 | 75 | 76 | 77 | 78 | 79 | 80 | 81 | 82 | 83 |
|---|---|---|---|---|---|---|---|---|---|---|---|---|
| Propylene, mL | 640 | 610 | 560 | 460 | 640 | 610 | 560 | 460 | 640 | 610 | 560 | 460 |
| 1-butene, mL | 20 | 50 | 100 | 200 | 0 | 0 | 0 | 0 | 0 | 0 | 0 | 0 |
| 1-pentene, mL | 0 | 0 | 0 | 0 | 20 | 50 | 100 | 200 | 0 | 0 | 0 | 0 |
| 1-octene, mL | 0 | 0 | 0 | 0 | 0 | 0 | 0 | 0 | 20 | 50 | 100 | 200 |
| C.E. g/g-cat/h | 13200 | 11000 | 10600 | 10700 | 13000 | 10400 | 10300 | 8000 | 12600 | 12200 | 12300 | 11000 |
| wt % $C_{4-8}$[a] | 1.8 | 5.9 | 11.4 | 28.7 | 3.5 | 4.2 | 8.9 | 26.4 | 1.2 | 3.0 | 8.5 | 13.8 |
| $nc_3$[b] | 69.7 | 21.8 | 11.3 | 4.6 | 65.7 | 39.8 | 19.5 | 8.0 | 186.2 | 84.7 | 32.7 | 17.4 |
| $nc_{4-8}$[c] | — | 1.1 | 1.1 | 1.4 | — | — | 1.1 | 1.6 | — | — | — | 1.1 |
| H.F., J/g | 28.3 | 25.4 | 18.3 | 7.4 | 23.9 | 18.4 | 16.9 | 10.4 | 26.2 | 24.0 | 19.9 | 14.3 |
| m.p., °C. | 149.0 | 136.6 | 131.6 | 110.1 | 146.5 | 139.9 | 132.5 | 130.0 | 150.5 | 147.2 | 144.2 | 144.4 |
| $T_g$, °C. | −1.5 | −3.0 | −5.1 | −9.8 | −2.1 | −3.4 | −3.9 | −6.8 | −2.8 | −3.0 | −5.6 | −11.9 |
| MFR, g/10 min | 3.2 | 4.0 | 2.8 | 6.6 | 3.8 | 5.0 | 6.8 | 10.2 | 2.9 | 3.8 | 5.3 | 8.9 |
| Density, g/cm³ | 0.873 | 0.865 | 0.869 | 0.864 | 0.871 | 0.868 | 0.866 | 0.856 | 0.87 | 0.874 | 0.866 | 0.863 |
| MEK sol % | 8.1 | 6.8 | 5.2 | 4.6 | 8.0 | 7.2 | 8.2 | 6.1 | 7.6 | 8.1 | 7.4 | 7.0 |

Batch polymerization in 1 liter autclave. Catalyst 10 mg; TEA/Si 200; Total liquid monomer charge 660 mL; 60° C.; 1 hr.
[a]Weight percentage of co-monomer incorporation.
[b]Number average sequence length for propylene units.
[c]Number average sequence length for co-monomer units.

The following examples illustrate various types of polymers produced according to the present invention by using ethylene and at least one other co-monomer as a monomeric raw material. These particular polymers used propylene as the other co-monomer in the monomeric raw material with ethylene.

TABLE IX

HIGHER ETHYLENE FPO PRODUCTS

| EXAMPLE NO. | 84 | 85 | 86 | 87 | 88 | 89 | 90 | 91 | 92 | 93 |
|---|---|---|---|---|---|---|---|---|---|---|
| LOT Melt Flow, g/10 min @ 230° C. | 5.3 | 5 | 5.8 | 5.7 | 5.5 | 5.3 | 4.7 | 5 | 5.5 | 5.2 |
| Ethylene Content, wt % | 2.2 | 3.8 | 5.7 | 7.3 | 9.7 | 9.6 | 14.8 | 17.7 | 15 | 16.6 |
| DSC $M_p/F_p$ (° C.) | 147.2/93.8 | 144.5/92.2 | 136.6/88.1 | 132.0/85.3 | 127.6/84.4 | 127.9/84.5 | 123.3/80.9 | 118.9/77.6 | 120.5/77.7 | 114.9/00.5 |
| Enthalpy (J/g) | 17.5/21.6 | 14/−19.7 | 14.1/−13.1 | 11.5/−12.6 | 7.9/−10.6 | 8.1/−9.6 | 5.7/−7.7 | 4/−4.4 | 5.2/−6.8 | 4.5/−4.9 |
| Density, g/cm³ | — | — | 0.8683 | — | — | 0.8597 | — | 0.8446 | — | — |
| DSC $T_g$, ° C. | — | −6.7 | −9.3 | −16.2 | — | −17.7 | −24.1 | −26.1 | — | — |
| MEK Solubles, wt % | 9.03 | 9.42 | 7.89 | 7.67 | 7.07 | 6.77 | 6.8 | 7.2 | — | — |
| Diethyl Ether Sol., wt. | 31.5 | 35.9 | 41.5 | 45.2 | 47 | 45.5 | 48.2 | 47.4 | — | — |
| Hexane Sol. wt % | 39.5 | 45.6 | 51.8 | 62.6 | 70.5 | 68.6 | 77.3 | 81.6 | 80.6 | 82.3 |
| Shore Hardness, A/D scales | 377− | 377− | 28/85 | 25/81 | 20/75 | 20/76 | 15/67 | 12/61 | 15/66 | 12/62 |
| Shrinkage Test: | | | | | | | | | | |
| Length (in/in) | — | 0.0363 | — | — | — | 0.0669 | | 0.0838 | — | — |
| Width (in/in) | — | 0.0016 | — | — | — | −0.0078 | | −0.0065 | — | — |
| Molecular Weight Measures: | | | | | | | | | | |
| GPC Mn (×1000) | 27 | 26 | 27 | 27 | 27 | 27 | 27 | 28 | 32 | 27 |
| Mw (×1000) | 219 | 221 | 222 | 224 | 222 | 226 | 218 | 207 | 219 | 203 |
| Mz (×1000) | 792 | 836 | 873 | 889 | 905 | 916 | 968 | 850 | 857 | 821 |
| PDI | 8.1 | 8.5 | 8.22 | 8.3 | 8.22 | 8.4 | 8.1 | 7.4 | 6.8 | 7.5 |

TABLE X

| EXAMPLE NO. | 84 | 85 | 86 | 87 | 88 | 89 | 90 | 91 | 92 | 93 |
|---|---|---|---|---|---|---|---|---|---|---|
| Strain @ Break (%) | NB(>700) | — | NB(>700) | — | — | NB(>700) | — | NB(>700) | — | — |
| Tensile Modulus (kpsi) | 5.1 | 3.8 | 2.6 | 2.2 | 1.6 | 1.6 | 1.2 | 0.87 | 1.11 | 0.88 |
| Tensile Strain at Yield (%) | NY | NY | NY | NY | NY | NY | NY | NY | NY | NY |
| Tensile Strain at Yield (psi) | NY | NY | NY | NY | NY | NY | NY | NY | NY | NY |
| Tensile Strain at Break (%) | NB | NB | NB | NB | NB | NB | NB | NB | NB | NB |
| Tensile Strain at Yield (psi) | NB | NB | NB | NB | NB | NB | NB | NB | NB | NB |
| Tensile Strain at Max. Stain (311%) (psi) | 936 | 844 | 699 | 626 | 550 | 547 | 359 | 270 | 354 | 291 |
| Tensile Set after 300% Extension (%) (0/24 h) | 31/16 | 30/17 | 30/15 | 29/15 | 29/13 | 29/13 | 35/13 | 38/13 | 36/14 | 36/13 |
| VICAT Softening Temperature (° C.) | 40 | 40 | 40 | 39 | 43 | 43 | 23 | 23 | 23 | 23 |
| Melt Swell Ratio (210° C./5 kg) | 1.502 | 1.52 | 1.55 | 1.566 | 1.524 | 1.536 | 1.486 | 1.49 | 1.498 | 1.46 |

TABLE X-continued

| EXAMPLE NO. | 84 | 85 | 86 | 87 | 88 | 89 | 90 | 91 | 92 | 93 |
|---|---|---|---|---|---|---|---|---|---|---|
| Zero-Shear Viscosity (Pa-s) | 9675 | 8823 | 8312 | 8796 | 8456 | 8624 | 8713 | 7945 | 7984 | 7740 |
| Crossover Modulus (Pa) | 22044 | 22277 | 22461 | 22800 | 24509 | 24638 | 29304 | 31881 | 29641 | 30252 |
| PDI = 100,000/Gc | 4.54 | 4.49 | 4.45 | 4.38 | 4.08 | 4.06 | 3.41 | 3.14 | 3.37 | 3.31 |
| Crossover Frequency, rad/s | 21.09 | 23.2 | 25.6 | 25.13 | 27.75 | 27.99 | 34.04 | 40.21 | 37.17 | 39.75 |

TABLE XI

HIGHER ETHYLENE FPO PRODUCTS WITH DONOR ADDED

| EXAMPLE NO. | 94 | 95 | 96 | 97 | 98 | 99 |
|---|---|---|---|---|---|---|
| LOT Melt Flow, g/10 min. @ 230° C. | 5.5 | 8.4 | 4 | 4.8 | 5.6 | 6.9 |
| Ethylene Content, wt % | 9.7 | 6.2 | 14.7 | 12.6 | 9.8 | 9.8 |
| DSC $M_p/F_p$ (° C.) | 132.2/86.6 | 136.3/93/1 | 121.9/81.1 | 126/84.6 | 130.8/88.8 | 130.8/87.5 |
| Enthalpy (J/g) | 27.3/−30.7 | 23/−24.7 | 14.6/−19.4 | 17.8/20.3 | 21/−18.9 | 29.4/−30.7 |
| Density, g/cm$^3$ | — | — | — | — | 0.874 | 0.878 |
| MEK Solubles, wt % | 4.96 | 6.31 | 3.4 | — | — | — |
| Diethyl Ether Sol., wt % | 23 | 27.7 | 29.5 | — | — | — |
| Shrinkage Test: | | | | | | |
| Length (in/in) | — | 0.0125 | 0.0181 | — | 0.0131 | 0.0125 |
| Width (in/in) | — | 0.0137 | 0.0143 | — | 0.0133 | 0.0136 |
| I.V. of neat polymer, dl/g | 1.9 | 1.3 | 1.65 | — | — | — |
| I.V. of ether soluble fraction, dl/g | 0.57 | 0.37 | 0.8 | — | — | — |
| Cast Film 1 mil by 6 inches: | | | | | | |
| Measured Thickness (mil) | 1.4–1.5 | 1.4–1.7 | 1.4–1.5 | — | — | — |
| Machine Direction | | | 711 | | | |
| Stress @ Yield (psi) | 1047 | 959 | 1356 | — | — | — |
| Stress @ Break (psi) | 2760 | 2043 | 552 | — | — | — |
| Strain @ Break (%) | 538 | 653 | — | — | — | — |
| Transverse Direction | | | | | | |
| Stress @ Yield (psi) | 733 | 774 | 566 | — | — | — |
| Stress @ Break (psi) | NB(1500) | NB(1510) | NB(1190) | — | — | — |
| Strain @ Break (%) | NB | NB | NB | — | — | — |

40

TABLE XII

| Sample ID | Core Loayer | Skin Layer (I) | Skin Layer (II) | Core thickness (mils) | Skin (I) Thickness | Skin (II) Thickness | Stress @ Yield (psi) MD/TD | Stress @ Break (psi) MD/TD | Strain @ Break (%) MD/TD | 1% Secant Modulus (kpsi) MD/TD |
|---|---|---|---|---|---|---|---|---|---|---|
| A | FPO (A) | 13S10A | 13S10A | 1.0 | 0.5 | 0.5 | 2499/2313 | 5386/2843 | 657/700 | 61/63 |
| B | FPO (B) | 13S10A | 13S10A | 1.0 | 0.5 | 0.5 | 1884/1764 | 4771/2529 | 674/593 | 45/45 |
| C | FPO (C) | 13S10A | 13S10A | 1.0 | 0.5 | 0.5 | 2057/1728 | 4858/2990 | 584/700 | 46/47 |
| D | FPO (A) | 13S10A | 13S10A | 1.5 | 0.25 | 0.25 | 1613/1552 | 3816/2178 | 669/700 | 36/34 |
| E | FPO (B) | 13S10A | 13S10A | 1.5 | 0.25 | 0.25 | 1444/1267 | 4328/2317 | 690/654 | 27/27 |
| F | FPO (C) | 13S10A | 13S10A | 1.5 | 0.25 | 0.25 | 1403/1209 | 4118/2410 | 612/700 | 27/27 |

TABLE XIII

| Sample ID | Elmendorf Tear (grams) MD/TD | Haze (YI Trans) | Dart Impact (grams) | 45 Degree Gloss | Autoclave 121 degrees C for 20 min. | Autoclave 137 degrees C for 20 min. | N-hexane solubles (%) | xylene solubles (%) | Water vapor transfer rate grams/100 in2 | oxygen transfer rate cc/100 in2 |
|---|---|---|---|---|---|---|---|---|---|---|
| A | 62/416 | 7.68 | 292 | 67.2 | pass | pass | 2.22 | 28.8 | 0.365 | 145 |
| B | 206/933 | 1.38 | 499 | 83.5 | pass | pass | 2.92 | 23.6 | 0.463 | 153 |
| C | 150/1178 | 3.14 | 459 | 81.8 | pass | pass | 3.05 | 24.0 | 0.403 | 160 |
| D | 357/874 | 16.7 | 400 | 51.2 | pass | pass | 4.91 | 43.5 | 0.445 | 162 |
| E | 402/922 | 0.48 | 648 | 90 | pass | pass | 4.00 | 22.0 | 0.508 | 202 |
| F | 414/1219 | 1.16 | 684 | 90 | pass | pass | 4.61 | 56.6 | 0.401 | 192 |

The Outer Skin Layers Composition

The inner core layer comprising an FPO polymer as disclosed herein tends to retain some degree of stickiness even when conditions of production of the resin upon which it is based are tailored to minimize such. Accordingly, it is a purpose of the outer skin layers to enable one to take advantage of the beneficial properties inherently characteristic of the FPO polymers including: flexibility, softness, durability, optical clarity, and favorable sealing properties, while masking the unfavorable stickiness characteristic. Towards this end it is anticipated that a multitude of outer skin layers shall be found to be suitable as having utility within the scope of the instant invention. The materials having utility as outer skin layer materials according to this invention include, but are not limited to: linear low density polyethylene; high density polyethylene; high pressure, low density polyethylene; highly branched low density polyethylene; atactic polypropylene, isotactic polypropylene, polyvinylidene chloride; polyvinyl chloride; various polyacrylates, ethylene vinyl acetate copolymers; ethylene vinyl alcohol polymers; polyesters; and copolymers of any of the foregoing with one another or a monomer selected from alpha olefins having between about 4 and 12 carbon atoms per molecule, with or without pendant substituents. However, the most preferred material useful as an outer skin layer is the polypropylene known as "PP 13S10A" available from Rexene Products Company, 2400 South Grandview Avenue, Odessa, Tex. Preferred skin layer materials include those having densities from about 0.87 to 0.96 with melt indices from about 1.0 to about 16. Preferably, both skin layers are of identical composition.

The Intermediate Layers Composition

As depicted in FIG. 2 the present invention contemplates the use of intermediate layers 43 and 37 sandwiched between the core layer 24 and the outer layers 20 and 64. The purpose of these layers is to act as barrier layers or to assist in the sealibility of the composite as a whole. Materials suitable for use as the intermediate layers 43 and 37 include: polyolefins; Ziegler/Natta—type or metallocene-catalyzed ethylene-based polyethylene or polypropylene and comonomers thereof with monomers containing between about 4 and 12 carbon atoms per molecule; linear low density polyethylene (LLDPE; anhydride-grafted ethylene vinyl acetate; polymerized ethylene vinyl alcohol or copolymers thereof with other monomers selected from monomers having between about 4 and 12 carbon atoms per molecule; and mixtures or blends of the foregoing with one another.

The Preferred Film Composite

The film products of this invention may be produced using polymers prepared using the catalysts and processes described above as core and skin layer materials using co-extrusion technology well-known in the art. Generally, co-extrusion is a process of extruding two or more materials through a single die with two or more orifices arranged so that the extrudates merge and weld together into a laminar structure before quenching. Each material is fed to the die from a separate extruder, but the orifices may be arranged so that each extruder supplies two or more poles of the same material. Coextrusion can be employed in film blowing, free film extrusion, and extrusion coating processes. The advantage of co-extrusion is that each ply of the laminate imparts a desired characteristic property, such as stiffness, heat sealibility, impermeability or resistance to some environment, all of which properties would be impossible to attain with the use of any single material. Although the preferred method for producing the films of this invention is co-extrusion, it will be understood that other conventional thermoplastic film-forming techniques may be employed including the commonly-used tubular extrusion process utilizing an entrapped air bubble to expand the extruded film tube, as well as cast techniques. The fact that production of multi-layer films by co-extrusion technology is well-known to those of ordinary skill in the art to which the instant invention pertains is evidenced by U.S. Pat. Nos.: 4,856,656; 4,870,122; 5,041,316; 5,075,143; 5,206,075; 5,252,384; 5,254,393; 5,296,580; 5,358,792; 5,376,439; 5,387,470; 5,397,613; 5,468,440; 5,478,890; 5,482,771; 5,543,223; 5,558,930; 5,562,958; 5,571,619; 5,582,923; 5,589,561; 5,593,747; 5,614,297; 5,629,059; 5,635,262; 4,399,180; 4,418,114; and 4,574,104, the contents of which are hereby fully incorporated by reference.

The instant invention contemplates the use as core layer materials of all polymeric materials previously described herein which are made using the novel catalyst material also disclosed. Accordingly, the scope of this invention is very broad indeed. This is particularly true when it is considered that the novel inner core layer (FPO) material(s) may be combined with a multitude of prior art outer skin and intermediate layers in order to arrive at novel and useful multilayer film structures suitable for use in various packaging applications.

Of the many multi-layer film structures made possible through the discovery of the catalyst materials herein disclosed, the best mode thus far seen by the inventors hereof has been the one in which the multilayer structure is a three-layer configuration comprising a core layer which is composed of homopolymer FPO produced using a catalyst prepared according to Example 54. Such most preferable core layer material is known as "W101" and is available from Rexene Products Company, 2400 South Grandview Avenue, Odessa, Tex. W101 is referred to in the tables as "FPO (A)". Other FPO polymers useful as core layer materials, though less preferably, include "FPO (B)" and "FPO (C)" which are also available from Rexene products and have commercial designations of W107 and W110 respectively. The most preferred outer skin layer is the polypropylene known as "PP 13S10A", also available from Rexene Products Company. Properties of films produced in accordance with this invention are set forth in tables XII and XIII.

The total thickness of the multi-layer film composite of this invention is in the range of about 0.5 mil to 10 mils, more preferably about 1 to 3 mils, with a thickness of 2 mils being most preferred. The thickness of the individual component layers may vary. In general, however, the thickness and composition of the two outer layers are identical to one another, although such is not necessary. Preferably, the thickness of a given outer layer is about: ¹/₁₀ (one-tenth) to ²/₃ (two-thirds) as thick as the core layer, and in the preferred embodiment the thickness of the skin layers is one-half of the thickness of the core layer, in the three layer arrangement. That is, the outer layer is a minimum of 25% of the total thickness of the film product. Most preferably, the thickness of the core layer is 1.0 mil. When intermediate layers are employed, individual layer thickness is anticipated to be readily adjusted by one of ordinary skill in the art to achieve a desired overall thickness for a particular application.

Consideration must be given to the fact that although the instant invention has been shown and described with respect to certain preferred embodiments it is obvious that equivalent alterations and modifications will occur to others skilled in the art upon the reading and understanding of the specification. The present invention includes all such equivalent alterations and modifications and is limited only by the scope of the appended claims.

What is claimed is:

1. A co-extruded multi-layer film product comprising:
   a) a core layer having a first side and a second side;
   b) a first outer layer disposed on the first side of said core layer; and
   c) a second outer layer disposed on the second side of said core layer,
   wherein said core layer comprises a polyolefin polymer having a heat of fusion of about 0.4 Joules per gram (J/g) to 75 Joules per gram, a polydispersity index of less than about 10, a melt flow rate of between about 0.3 grams per 10 minutes to about 30 grams per 10 minutes at 230 degrees Centigrade, and a methyl ethyl ketone soluble fraction content between about 1 and 12 weight percent.

2. The film product of claim 1 wherein said polyolefin polymer comprises a homopolymer.

3. the film product of claim 2 wherein said homopolymer is a homopolymer of propylene.

4. The film product of claim 1 wherein said polyolefin polymer comprises a copolymer made from copolymerization of a plurality of different monomers.

5. The film product of claim 4 wherein said plurality of monomers includes propylene and at least one monomeric raw material having between about 4 and 12 carbon atoms per molecule.

6. The film product of claim 5 wherein said plurality of monomers includes propylene and at least one monomeric raw material selected from the group consisting of: ethylene, 1-butene, 1-hexene, and 1-octene.

7. The film product of claim 1 wherein said heat of fusion is in the range of greater than 20 J/g to about 40 J/g.

8. The film product of claim 1 wherein said methyl ethyl ketone soluble fraction content is between about 1 and 5 percent by weight.

9. The film product of claim 1 wherein said melt flow rate is between about 3.0 grams per 10 minutes and 25 grams per 10 minutes.

10. The film product of claim 1 wherein the thickness of the core layer is between about 2 to 10 times the thickness of at least one of the outer layers and the outer layers have the same thickness.

11. A film product according to claim 1 wherein at least one of said first and second outer layers comprises a polymeric material selected from the group consisting of: ethylene methyl acrylate copolymer; a butene, hexene, or octene copolymer of polyethylene; ethylene acrylic acid copolymer; ethylene methacrylic acid copolymers; hexene-butene copolymers; ionomers; acid or anhydride modified ethylene vinyl acetate copolymers; medium density polyethylene; low density polyethylene; ultra low density polyethylene; metallocene catalyzed polyethylenes containing a comonomer of butene, hexene, or octene; and blends thereof.

12. The film product of claim 1 wherein said first and second outer layers are composed of a material which comprises a polymer selected from the group consisting of: medium density polyethylene, low density polyethylene, ultra low density polyethylene, isotactic polypropylene, syndiotactic polypropylene, or blends thereof.

13. A multi-layer film product comprising:
   a) a core layer having a first and a second side, said core layer comprising a polyolefin polymer having a heat of fusion of about 0.4 Joules per gram (J/g) to 75 Joules per gram, a polydispersity index of less than about 10, a melt flow rate of between about 0.3 grams per 10 minutes to about 30 grams per 10 minutes at 230 degrees Centigrade, and a methyl ethyl ketone—soluble fraction content between about 1 and 12 weight percent;
   b) a first outer layer disposed on one side of said core layer; and
   c) a second outer layer disposed on the remaining side of said core layer,
   wherein said film product contains an n-hexane soluble fraction of less than about 2.6% by weight of the total film mass as determined by exposing said film to n-hexane at a temperature of 50 degrees centigrade for a period of 2 hours.

14. The film product of claim 13 further comprising a xylene, soluble fraction in an amount less than about 30% by weight of the total film mass as determined by exposing said film to refluxing xylene for 2 hours.

15. The film product according to claim 14 wherein the thickness of at least one outer layer is between about 1/10th to 2/3 of the thickness of the core layer.

16. The product of claim 15 wherein the total thickness of the film product is between about 0.5 mils and 15 mils.

17. The film product of claim 16 wherein the total thickness of the film product is between about 0.3 and 3 mils.

18. The film product of claim 16 further comprising at least one intermediate layer sandwiched between said core layer and said first or second outer layers.

19. The film product of claim 18 wherein said intermediate layer is composed of a polymeric material comprising a material selected from the group consisting of: polyolefins, Ziegler/Natta catalyzed or metallocene-catalyzed polyethylene, polypropylene, or copolymers thereof with alpha-olefins having from 4 to 12 carbon atoms per molecule; linear low density polyethylene; anhydride-grafted ethylene vinyl acetate; polymerized ethylene vinyl alcohol or copolymers thereof with other monomers selected from monomers having from 4 to 12 carbon atoms per molecule; and mixtures or blends of the foregoing with one another.

20. 1) A co-extruded multi-layer film product comprising:
   a) a core layer having a first side and a second side;
   b) a first outer layer disposed on the first side of said core layer;
   c) a second outer layer disposed on the second side of said core layer; and
   d) at least one intermediate layer sandwiched between said core layer and said first or second outer layers,
   wherein said core layer comprises a polyolefin polymer having a heat of fusion of about 0.4 Joules per gram (J/g) to 75 Joules per gram, a polydispersity index of less than about 10, a melt flow rate of between about 0.3 grams per 10 minutes to about 30 grams per 10 minutes at 230 degrees Centigrade, and a methyl ethyl ketone soluble fraction content between about 1 and 12 weight percent.

21. The film product of claim 20 wherein said intermediate layer is composed of a polymeric material comprising a material selected from the group consisting of: polyolefins, Ziegler/Natta catalyzed or metallocene-catalyzed polyethylene, polypropylene, or copolymers thereof with alpha-olefins having from 4 to 12 carbon atoms per molecule; linear low density polyethylene; anhydride-grafted ethylene vinyl acetate; polymerized ethylene vinyl alcohol or copolymers thereof with other monomers selected from monomers having from 4 to 12 carbon atoms per molecule; and mixtures or blends of the foregoing with one another.

22. The film product of claim 20 further comprising an n-hexane soluble fraction in an amount less than about 2.6% by weight of the total film mass as determined by exposing said film to n-hexane at a temperature of 50 degrees centigrade for a period of 2 hours.

23. A co-extruded multi-layer film product comprising:
   a first layer comprising a polyolefin polymer having a heat of fusion of about 0.4 to 75 J/g, a polydispersity index of less than about 10, a melt flow rate from about 0.3 to 30 g/10 min. at 230° C., and a methyl ethyl ketone soluble fraction from about 1 to 12 weight percent; and
   a second layer disposed on the first layer.

24. The film product of claim 23, wherein the second layer comprises at least one of a linear low density polyethylene; high density polyethylene; high pressure low density polyethylene; highly branched low density polyethylene; atactic polyethylene; isotactic polypropylene; polyvinyl chloride; polyvinylidene chloride; polyacrylate; ethylene vinyl acetate copolymers; ethylene vinyl alcohol copolymers; polyester; or a monomer selected from alpha-olefins having from 4 to 12 carbon atoms per molecule, with or without substituents; or a combination thereof.

25. The film product of claim 24, wherein said linear low density polyethylene comprises octene as a comonomer.

* * * * *